Oct. 3, 1967  R. T. LAWRIE  3,345,028
SUSPENSION DEVICE FOR LANTERNS
Filed Oct. 12, 1965
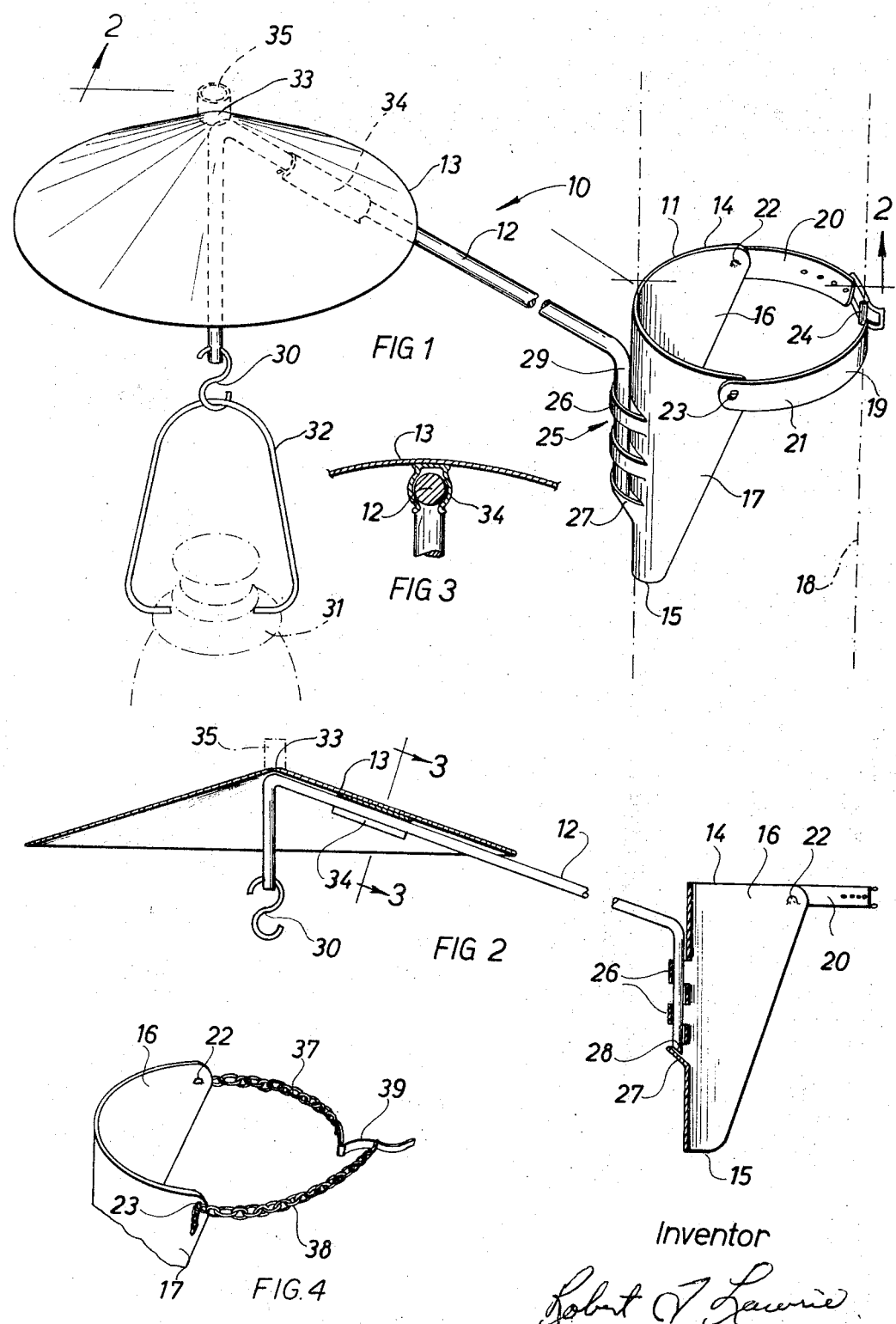
Inventor
Robert T. Lawrie

United States Patent Office 3,345,028
Patented Oct. 3, 1967

3,345,028
SUSPENSION DEVICE FOR LANTERNS
Robert T. Lawrie, 44 1st St. W., Elmira, Ontario, Canada
Filed Oct. 12, 1965, Ser. No. 495,115
6 Claims. (Cl. 248—231)

ABSTRACT OF THE DISCLOSURE

An attachment member having a downwardly extending laterally deformable object gripping part provided with vertically opening socket means on its face supporting a lantern supporting arm to which a deflector is detachably secured.

This invention relates to improvements in camping equipment, and more particularly to improvements in suspension devices for lanterns.

It is common practice to utilize pressure gasoline lanterns to illuminate camp sites and the like where electric light is not available. Such lanterns may be stood on the ground or placed on a table but this is dangerous inasmuch as the lamp could easily be kicked or knocked over with consequent danger of fire. Furthermore much of the illumination is wasted and shadows cast by the lamp when below eye level generally preclude reading and related activities. Another disadvantage of this positioning is that persons tend to look directly at the lamp when it is illuminated and a temporary blinding effect is generally experienced.

In order to avoid these inconveniences, campers often suspend the lanterns from trees and in most instances utilize a rope attached to a convenient branch to suspend the lantern. The disadvantages of this method lie in the fact that often there is no convenient branch low enough to attach the rope to it and furthermore, heat from the lantern might cause the rope to ignite and again result in a serious fire hazard. Still another fire hazard is presented when the branch is too low and the lamp is too close to the branch and to the surrounding foliage.

In other instances nails have been driven into trees to support lanterns and this may result in the growth of the tree being affected and, in some instances, may cause the tree to die.

It is, therefore, a primary object of the instant invention to provide a suspension device for lanterns which will maintain a lantern at any selected height.

Another object of my invention is to provide a suspension device for lanterns which may be attached to the trunk of a tree or any similar object without causing any damage to the tree.

A further object of the invention is to provide a suspension device for lanterns which is quickly and easily attached to, or removed from, a tree trunk or the like.

Still another object of my invention is to provide a suspension device for lanterns which is adapted to fit tree trunks over a wide range of diameters.

Yet a further object of the invention is to provide a suspension device for lanterns which will, if required, shield surrounding foliage from the heat of the lantern.

Another object of the invention is to provide a suspension device for lanterns which is simple and inexpensive to manufacture and which may be readily available to the general public at a reasonable price.

Still another object of the invention is to provide a suspension device for lanterns which is easily and conveniently packaged and stored.

A further object of the invention is to provide a suspension device for lanterns in which, in one embodiment thereof, the deflector may be adapted for use as a funnel.

I achieve these and other objects and features by providing a band of vertically rigid but laterally flexible material which is attachable to a tree trunk or the like by adjustable strap or chain means. A suspension arm fits in a socket provided on the band and extends outwardly therefrom to terminate in a suspension hook from which the lantern is hung. A deflector is clipped on the suspension arm above the suspension hook and, being generally conical, is easily adaptable to serve as a funnel when detached from the suspension arm.

In drawings which illustrate various embodiments of the invention,

FIGURE 1 is a perspective view of the suspension device for lanterns of the present invention, a tree trunk to which it is attached being shown in phantom, FIGURE 2 is a sectional side elevation of the device of FIGURE 1, taken on the line 2—2, FIGURE 3 is a sectional end elevation of the suspension arm and the deflector, taken on the line 3—3 of FIGURE 2, and FIGURE 4 is a fractional perspective view of the device of FIGURE 1 to which an alternative attachment chain device is fitted.

Referring to the drawings. FIGURES 1 and 2 illustrate a suspension device for lanterns 10 of the present invention which includes an attachment member 11, a suspension arm 12 and a deflector 13. The attachment member 11 is formed of flexible material such as, for instance, sheet metal which, upon being bent to assume a tubular or part-tubular shape becomes rigid in its axial plane while remaining flexible circumferentially. In this instance the member 11 is of generally inverted isosceles triangular conformation with the base of the triangle forming the upper edge 14 and the apex of the triangle forming the lowermost tip 15 of the member 11. The remaining two sides of the triangle define the lower edges of a pair of wing members 16 and 17 which are adapted to wrap around the trunk 18 of a tree or any other convenient upright member.

An adjustable strap device 19 is utilized to attach the member 11 to the trunk 18 and in a preferred embodiment the strap is formed of relatively soft material of relatively high tensile strength such as, by way of example, leather or canvas. The strap device 19 comprises two portions 20 and 21 each having one end attached to wings 16 and 17 respectively by hooks 22 and 23 respectively, formed in the wings, and joined by a clip 24 of any conventional type which will permit the strap device to closely bind the wings 16 and 17 around the trunk 18. In this manner the member 11 is caused to firmly grip the tree but at the same time there is no damage caused to the bark of the tree.

A socket-type receptacle 25 is formed on the vertical centre line of the triangle of member 11 and this may be tubular or, as illustrated in the drawings, in a preferred embodiment may comprise a series of spaced apart strips 26 punched out of the sheet material forming the member 11 and deformed to a more or less tubular configuration. The bottom strip is separated from the material only at its upper edge so that a cup device 27 is formed.

The suspension arm 12 is preferably of circular section rod material and its lower end 28 is adapted to fit closely in the receptacle 25, its lower end being supported by the cup 27. The shank 29 of the arm 12 extends upwardly and outwardly from the lower end 28 and terminates in a dependent hook.

Thus, upon being attached to a tree in the manner illustrated and described, the suspension device 10 may be utilized to support a lantern 31, the bail handle 32 of which is suspended from the hook 30.

The deflector 13 is of hollow, conical configuration and is adapted to attach at one side to the shank 29 of the arm 12, the apex 33 of the cone being substantially centred over the hook 30.

As shown in FIGURES 2 and 3 particularly, the deflector 13 is retained on the shank 29 by means of a spring clip 34 attached to the inner surface of the cone. In an alternative embodiment I also contemplate utilizing the deflector 13 as a funnel to facilitate filling the lamp or the like, and to this end the apex 30 may be perforated and a tubular stem 35 attached thereto.

FIGURE 4 illustrates an alternative chain device 36 to the strap device 19 in which a chain 37 attached to hook 22 on wing 16 and a chain 38 attached to hook 23 on wing 17 are joined by means of an over-centre locking arm 39 of conventional design. The overall effective length of the chain device 36 is adjusted by attached suitably positioned links of the chains 37 and 38 in their respective hooks 22 and 23.

It will be noted that when not required for use, the suspension device 10 may be stored in a very compact manner, the suspension arm 12 being removeable from the attachment member 11 and the latter lying substantially flat upon removal of the strap device 19 from the wings 16 and 17. The deflector 13 is, of course, detachable from the shank 29 of the arm 12.

In a preferred embodiment I also contemplate coating the inner, reflective surface of the deflector 13 with a light and heat reflective material such as, for instance, aluminum paint.

The embodiments of this invention in which an exclusive property or privilege is claimed are defined as follows:

1. In a device for suspending a lantern, in combination, a standard, an attachment member of flexible sheet metal having a vertically elongated, generally part-tubular, conformation extending lengthwise over a portion of said standard, said attachment member having its greatest width along its top edge whereby to extend over a considerable circumferential portion of said standard and tapering downwards to a relatively narrow lower end in surface engagement with the outer surface of said attachment member and maintaining said attachment member in a vertical plane, flexible tie members secured to said attachment member at the upper top corners thereof and extending around the part of said standard remote from said attachment member and adjustably connected at their other ends to effect lateral deformation of said attaching member to cause same to be brought into wrap-around surface-to-surface gripping contact with said standard, a substantially tubular receptacle means integral with said attachment member substantially medially of the exterior surface of said attachment member in the axial plane thereof, a lantern supporting arm having one end thereof closely fitting into said receptacle, said arm having a shank extending from said one end, and a lantern suspended from said shank.

2. A suspension device for lanterns as defined in claim 1 including a deflector; said deflector being substantially conical; clip means attached to the inner surface of said deflector; said clip means being detachably attachable to said shank to maintain said deflector on said shank substantially centered over said hook.

3. A suspension device for lanterns as defined in claim 1 in which said attachment member is of substantially isosceles triangular conformation, the vertex of the triangle being in the said axial plane upon said attachment member being deformed to said part-tubular configuration and the two base angles of said triangle forming wings; hook means extending outwards from said wings; said means to deform and retain said attachment member being an adjustable strap device attached at each end to said wings by said hook means.

4. A suspension device for lanterns as defined in claim 1 in which said sheet material is slit in a plurality of positions transversely of the centre line; said material bounded by said slits being deformed to form said receptacle and said material below the lowermost of said slits being deformed to form a cup shaped portion for the support of the extremity of said one end of said suspension arm.

5. A suspension device for lanterns as defined in claim 1 in which said attachment member is of substantially isosceles triangular conformation, the vertex of the triangle being in the said axial plane upon said attachment member being deformed to said part-tubular configuration and the two base angles of said triangle forming wings; hook means extending outwards from said wings; said means to deform and retain said attachment member being an adjustable chain device attached at each end to said wings by said hook means.

6. A suspension device for lanterns as defined in claim 2 in which said deflector is perforated at the apex thereof and a tubular stem extending axially upwardly therefrom to form a funnel.

References Cited
UNITED STATES PATENTS

| | | | |
|---|---|---|---|
| 561,664 | 6/1896 | Hollister | 248—231 X |
| 1,047,306 | 12/1912 | Schaak | 248—230 |
| 1,391,718 | 9/1921 | Clarkson | 211—107 |
| 3,141,642 | 7/1964 | Mayrath | 248—230 X |

CHANCELLOR E. HARRIS, *Primary Examiner.*